(12) United States Patent
Dasher et al.

(10) Patent No.: US 8,346,815 B2
(45) Date of Patent: Jan. 1, 2013

(54) DYNAMIC IMAGE DISPLAY AREA AND IMAGE DISPLAY WITHIN WEB SEARCH RESULTS

(75) Inventors: Grant Dasher, Cambridge, MA (US); Nundu Janakiram, San Francisco, CA (US); Matthew K. Gray, Reading, MA (US); David R. Bailey, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/106,403

(22) Filed: May 12, 2011

(65) Prior Publication Data
US 2012/0290566 A1 Nov. 15, 2012

(51) Int. Cl.
*G06F 17/30* (2006.01)
(52) U.S. Cl. ........ 707/802; 707/706; 707/713; 707/722; 707/758; 707/781
(58) Field of Classification Search ............ 707/600–899
See application file for complete search history.

(56) References Cited

U.S. PATENT DOCUMENTS

| | | | |
|---|---|---|---|
| 2002/0055891 A1* | 5/2002 | Yang | 705/27 |
| 2006/0155684 A1 | 7/2006 | Liu et al. | |
| 2007/0174790 A1 | 7/2007 | Jing et al. | |
| 2008/0313177 A1 | 12/2008 | Li et al. | |
| 2010/0158412 A1 | 6/2010 | Wang et al. | |

OTHER PUBLICATIONS

Pictures of Puppies—Bing http://www.bing.com/search?q=pictures+of+puppies&go=&qs=n&sk=&sc=8-18&form=QBLH [online] [printed Sep. 8, 2011] 1 page.
Rosenberg et al. U.S. Appl. No. 12/763,466, filed Apr. 20, 2010, 66 pages.
Rosenberg et al. U.S. Appl. No. 12/763,489, filed Apr. 20, 2010, 65 pages.
International Search Report and the Written Opinion of the International Searching Authority, PCT/US2012/037439, Oct. 10, 2012, 9 pages.

* cited by examiner

*Primary Examiner* — Isaac M Woo
(74) *Attorney, Agent, or Firm* — Fish & Richardson P.C.

(57) ABSTRACT

Methods, systems, and apparatus, including computer programs encoded on a computer storage medium, for providing image search results with web corpus search results. In one aspect, a method includes determining dimensions of an image display environment in which image search results are to be displayed, determining an insertion score that defines an ordinal insertion position at which the image display environment is to be inserted into a ranking of general search results that defines ordinal positions for each of the general search results, the dimensions and the insertion score determined, in part, from the quality scores of the images, generating a search results resource for displaying the general search results according to their respective ordinal positions and the image display environment at the ordinal insertion position on a client device, and providing the search results resource in response to the search query.

22 Claims, 7 Drawing Sheets

DYNAMIC IMAGE DISPLAY AREA AND IMAGE DISPLAY WITHIN WEB SEARCH RESULTS

BACKGROUND

This specification relates to search query processing.

The Internet provides access to a wide variety of resources, for example, webpages, image files, audio files, and videos. These resources including content for particular subjects, book articles, or news articles. A search system can select one or more resources in response to receiving a search query. A search query is data that a user submits to a search engine to satisfy the user's informational needs. The search queries are usually in the form of text, e.g., one or more query terms. The search system selects and scores resources based on their relevance to the search query and on their importance relative to other resources, and provides search results that link to the selected resources. The search results are typically ordered according to the scores and presented according to this order.

Search engines are used to search corpora. As used herein, a corpus is a collection of resources. Each corpus can include resources of multiple types (e.g., a general web corpus can include HTML documents, images documents, videos, etc.; an image corpus, on the other hand, can be limited to a collection of images and metadata for the images). Thus there are different types of corpora that a search engine searches. For example, a search engine searches general resource corpus index to search resources based on the textual content of the resources and relative authority ratings of the resources. Search results resulting from a search of the general resource corpus index typically include a title of the resource, a snippet of text from the resource, and a link to the resource. Likewise, a search engine searches an image corpus index to search for images that are responsive to a search query. The image corpus index may index the images based on labels (or text) associated with the images, similarity of the images to other images, click through rates of images with respect to queries, and authority ratings of the images. Search results resulting from a search of the image corpus index typically include a thumbnail version of the image, an embedded link to the image, and optionally label text associated with the image.

Most search engines provide the users options to search a particular corpus. Some search engines also provide image search results with general search results. Typically these image search results are shown in a fixed configuration display area and show a fixed number of image search results that are responsive to a search query.

SUMMARY

In general, one innovative aspect of the subject matter described in this specification can be embodied in methods that include the actions of: in response to an image insertion request specifying a request to insert image search results that are responsive to a search query into a list of general search results: determining dimensions of an image display environment in which image search results are to be displayed, the dimensions determined, in part, from a distribution of quality scores of images that are responsive to the search query and the dimensions defining number of rows of image search results that are to be displayed, determining an insertion score that defines an ordinal insertion position at which the image display environment is to be inserted into a ranking of the general search results that defines ordinal positions for each of the general search results, the insertion score determined, in part, from the quality scores of the images, generating a search results resource for displaying the general search results according to their respective ordinal positions and the image display environment at the ordinal insertion position on a client device; and providing the search results resource in response to the search query; wherein each of the image search results is a generated from a search of an image corpus and includes a thumbnail version of an image identified from the search of the image corpus and an address to retrieve the image, and each general search result is generated from a search of a resource corpus that is different from the image corpus and includes a snippet of text of a resource identified from the search and an address to retrieve the resource. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. The image display environment and position relative to general search results varies in proportion to the inferred user interest in images and the quality of the images that are responsive to the query. Accordingly, the presentation of the image information is reflective of both the inferred user interest and the quality of available images. Thus, if many high quality images are available, but there is little inferred interest in the images, then no image search results will be shown. Conversely, if there are few high quality images available, but there is a significant inferred interest in the images, then some image search results will be shown.

However, because the quality of the images are such that the user's informational needs may not be satisfied by the images, general search results reference resources that are determined to be more relevant to the search query are shown before the image search results. Accordingly, the user is presented with image search results in a manner that reduces the likelihood of topic drift and user frustration. Additionally, if there are many high quality images available, and there is a significant inferred interest in the images, then many image search results will be shown, and they will be prominently displayed relative to the general search results. Thus the user is presented with image search results in a manner that increases the likelihood that the user will find information that satisfies the user's informational needs.

Finally, by providing images at a position and frequency that is proportional to the quality of the images and the inferred interest, the overall user experience is improved relative to systems that do not take these factors into account. In particular, users are more likely to be presented with images at more prominent positions in the search results when the users are likely find such images useful or interesting.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

§1.0 Overview

This specification describes technologies relating to displaying image search results with general web search results. In an example implementation, a search system receives a search query from a user device for a search of a general resource index. The search system determines an image intent score for the query. If the image intent score does not meet an image intent threshold, then the search system generates general search results for only resources identified from a search of the general resource index. Conversely, if the image intent score does meet an intent threshold, then the search system inserts image search results with the general search results.

To insert the image search results, the search system first determines dimensions of an image display environment in which image search results are to be displayed. The dimensions vary in size from query to query. In some implementations, the dimensions depend on the intent score and quality scores of images for which image search results are to be displayed. For example, the higher the image intent score, and the higher overall quality of images that are identified as being responsive to the search query, the larger the dimensions of the image display environment. Thus, for a query with a very high image intent score, and for which many high-quality images are identified, the image display environment may be of such size to accommodate the display of multiple rows of image search results. Conversely, for query with a very high image intent score but for which few high-quality images are identified, the image display environment may be of such size to accommodate only a single row of image search results.

In addition to the dimensions of the image display environment, the search system also determines an insertion score for the image display environment. The insertion score determines where in an ordered list of general search results the image display environment is to be inserted. In particular, as the insertion score increases, the position in the ordered list of general search results in which the image display environment is to be inserted also increases. Thus, for a very high insertion score, the image display environment may be displayed above the general search results, or just below the first general search result.

These features and other features described in more detail below.

§1.1 Example Search System Environment

Figure 1:
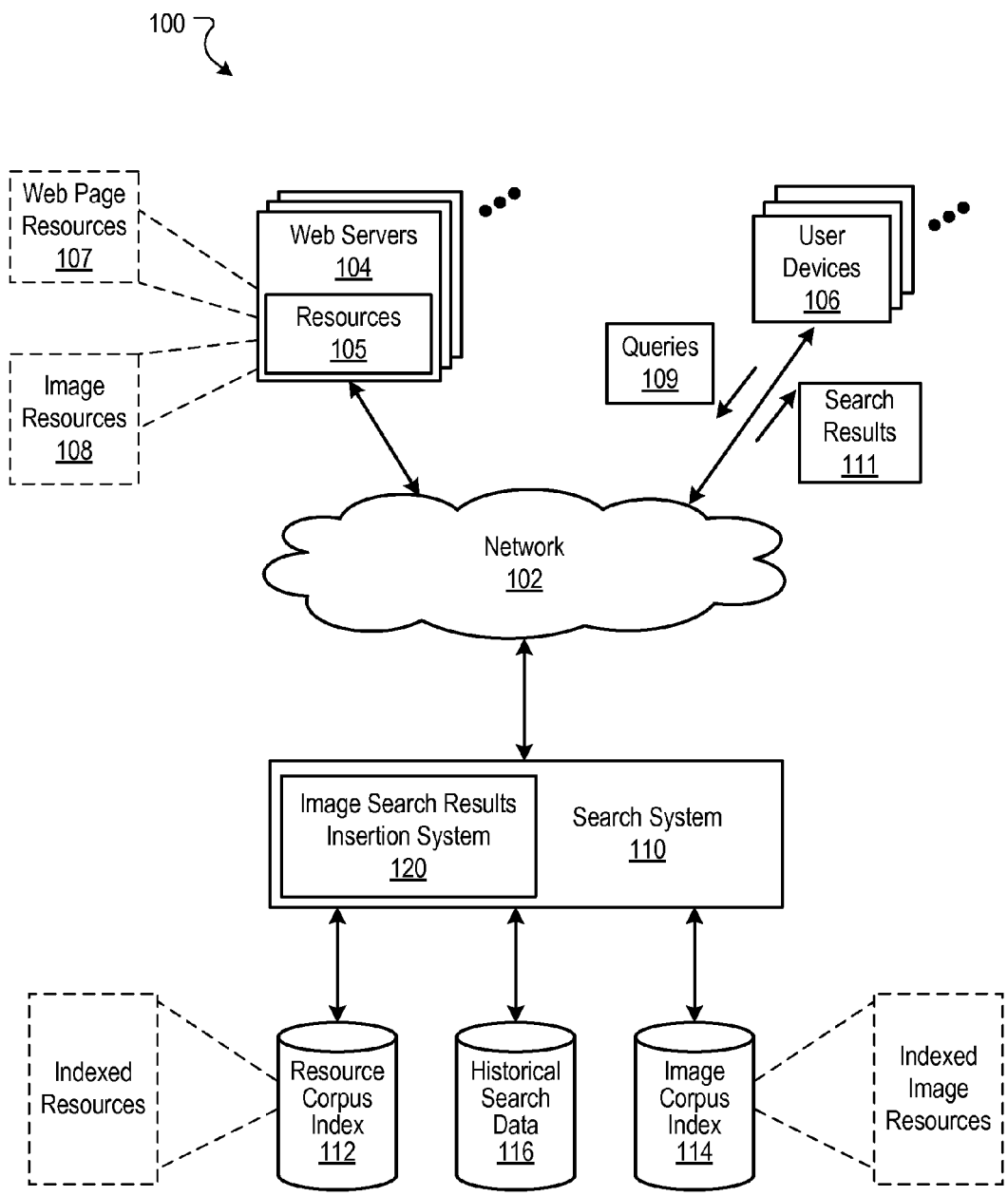
FIG. 1 is block diagram of an environment in which a search engine provides search services.

FIG. 1 is a block diagram of an example environment 100 for a domain video scoring system 120. The example environment 100 includes a network 102, e.g., a local area network (LAN), wide area network (WAN), the Internet, or a combination of them, that connects servers 104, user devices 106, and the search system 110. The environment 100 may include many thousands of servers 104 and user devices 106.

A web site 104 is a one or more resources 105 associated with a domain name, and each web site is hosted by one or more servers. An example web site is a collection of webpages formatted in hypertext markup language (HTML) that can contain text, graphic images, multimedia content, and programming elements, such as scripts. Each web site 104 is maintained by a publisher, e.g., an entity that manages and/or owns the web site.

Two particular types of resources are webpage resources 107 and image resources 108. Each resource type is associated with a resource address, such as a URL. Webpage resources include text and may also include links to other types of resources that are rendered and displayed with the text of the webpage resource. In particular, image resources 108 are often rendered with webpage resources 107. An example of an image resource 108 is data that is used to render an image of a subject. While image resources are typically included in webpage resources 107, they can also be hosted as separately addressable resources.

To facilitate searching of these resources 105, the search engine 110 identifies the resources by crawling the publisher web sites 104 and indexing the resources provided by the publisher web sites 104. In some implementations, the indexes are stored in a resource corpus index 112 and an image corpus index 114.

The indexes 112 and 114 are shown as separate indexes. However, in some implementations, the indexes can be combined in a single index, and search for a respective corpus can be constrained to the portion of the combined index that is used to index the respective corpus.

For a search of textual content, the resource corpus index 112 is searched, and resources are ranked based on information retrieval ("IR") scores that measure the relevance of the resource to the query, and optionally an authority score of each resource relative to other resources. In some implementations, the IR scores are computed from dot products of feature vectors corresponding to a search query 109 and a resource, and the ranking of the search results is based on relevance scores that are a combination (e.g., sums, products, or other mathematical combinations) of the IR scores and the authority scores. The search results 111 are ordered according to these relevance scores and provided to the user device according to the order.

For a search directed to images that uses a text query as input, the search system 110 accesses the image corpus index 114. In some implementations, the search system 110 determines a relevance score for an image (e.g., relevance with respect to label data for an image, and/or other techniques for determining relevance of an image to a textual query) and combines the score with a relevance feedback score of the image. An example relevance feedback score is a score derived from a click-through rate of an image when that image is referenced in an image search result.

The user devices 106 receive the search results, e.g., in the form of one or more webpages, and render the pages for presentation to users. In response to the user selecting a link in a search result at a user device 106, the user device 106 requests the resource identified by the link. The web site 104 hosting the resource receives the request for the resource from the user device 106 and provides the resource to the requesting user device 106.

Search queries 109 submitted during user sessions are stored in a data store such as the historical search data store 116. Selection data specifying actions taken in response to search results provided are also stored in the historical data store 116. The data stored in the historical data store can be used to map search queries 109 submitted during search sessions to resources that were identified in search results 111, and the actions taken by users. Data stored in the historical search data store 116 may be anonymized so that personal identifying information is removed, thus protecting the privacy of users.

The search results are data generated by the search system 110 that identifies resources that are responsive to a particular search query. Each search result includes a link to a corresponding resource, e.g., a link to a webpage for a general search result, or link to an image for an image search result. An example general search result includes a webpage title, a snippet of text, and a URL of the webpage. An example image search result includes a thumbnail of an image, a URL of the webpage in which the image is referenced, and, optionally, labeled data describing the subject of the image.

§1.2 Image Search Results

In some implementations, the search system 110 allows users to specify which corpus is to be searched for a search query. For example, the search system 110 may present, by use of user interface, and input menu that allows the user to select the resource corpus index 112, or the image corpus index 114 when submitting a search query. For example, if the user is solely interested in images, the user may select the image corpus index 114 for searching. Conversely, if the user is interested primarily in text articles, the user may elect to search only the resource corpus index 112. While there is overlap between the indexes 112 and 114, e.g., images may be indexed in both the image corpus index 114 and the resource corpus index 112, the search system 110 uses different search processes for each respective index 112 and 114.

Often, however, the user does not specify which index to use when searching. By default, the emphasis of the search is typically on the resource corpus index 112. Accordingly, a user that may be interested in both images and articles may not be provided with search results that link to some resources that would satisfy the user's informational needs. However, a user's informational needs with respect to a corpus to search can often be inferred from the search query. In particular, some search queries may indicate that a user is searching for a particular type of content indexed in a particular corpus. For example, for the search query "dog food," there may only be a few high-quality images that are responsive to the query, but there are many webpages that are very responsive to the query. Additionally, historical search data may indicate that most users select general search results in response to the query "dog food," and very few image search results are ever selected. Conversely, for the search query "dog pictures," there may be many high-quality images that are responsive to the query, and the historical search data may indicate that many users select image results in response to this query.

In some implementations, the search system 110 includes an image search results insertion system 120. As described above, the insertion system 120 determines an image intent for search query. If the image intent meets an intent threshold, then the search system 110 searches the image corpus index 114 and generates image search results for inclusion with the general search results. The image search results are displayed in an image display environment. The size of the image display environment, and the number of image search results that are displayed in the image display environment, is, in some implementations, dependent upon the image intent score and the quality of the images that are identified as being responsive to the search query.

Figure 2A:
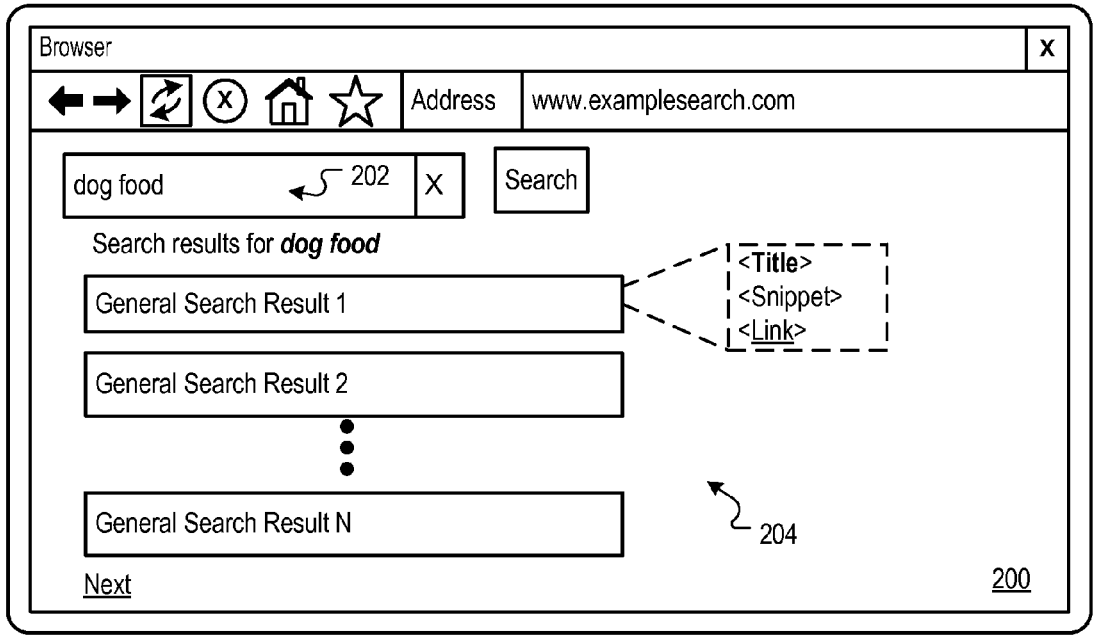
FIGS. 2A-2C are illustrations of search results pages.
Figure 2B:
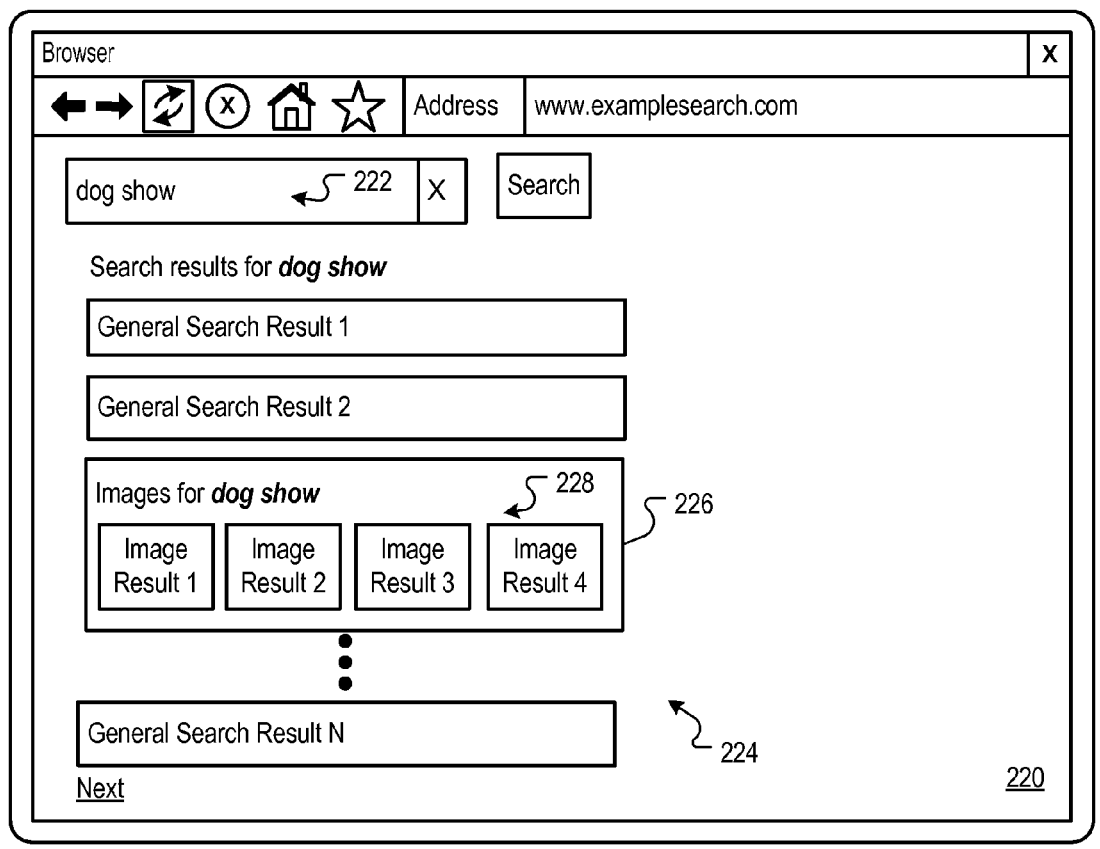
Figure 2C:
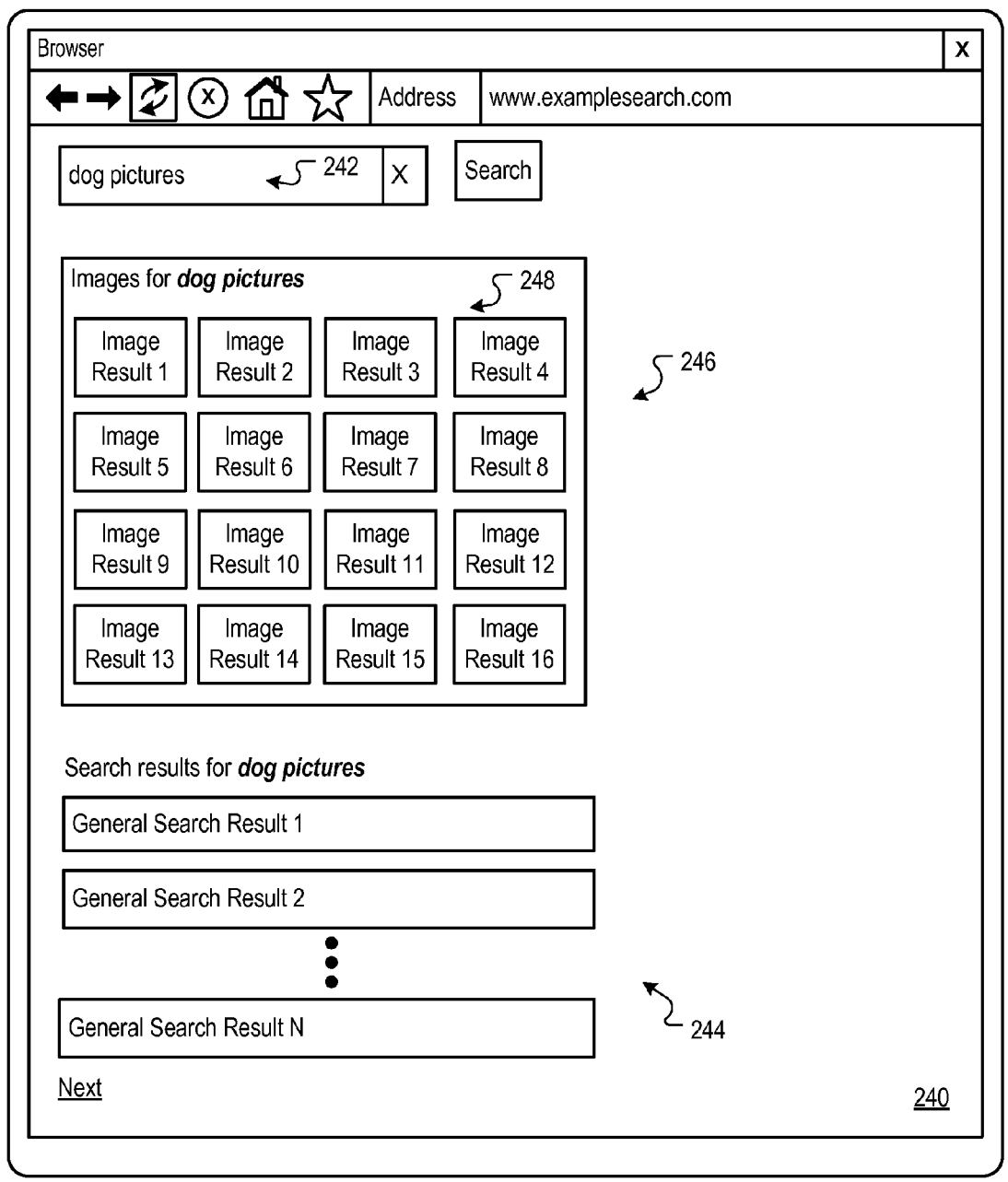

This feature is illustrated with respect to FIGS. 2A-2C, which are illustrations of search results pages 200, 220, and 240. The search results page 200 is a page returned in response to the query 202 ("dog food"). For this query, there are few high-quality images that are responsive to the query, but there are many webpages that are very responsive to the query. For example, very few images may be associated with labeled data that are relevant to the query "dog food." Additionally, those images that are associated with the labeled data that are relevant to the query "dog food" may have relatively low click through rates for the query. Finally, the query "dog food" may be submitted by users for a search of the resource index 112 much more frequently than for search of the image corpus index 114. The insertion system 120 can account for some or all of these facts to determine whether the query "dog food" meets an image intent threshold.

For the search results page 200, the search system 110 determined that the query "dog food" does not meet an image intent threshold. Accordingly, only general search results 204 are provided. Each search result 204 includes a title of a webpage, a snippet of text that is relevant to the search query 202, and a link to the webpage.

For query that meets an image intent threshold, the search system 110 returns a search results page with image search results displayed in an image display environment. The search results pages 220 and 240 of FIGS. 2B and 2C are example results pages for two queries that meet an image intent threshold. In particular, the image intent for the query 222 ("dog show") is less than the image intent for the query 242 ("dog pictures"). Accordingly, the number of image search results that are shown with the general search results, and the position at which the image search results are shown in each page 220 and 240, differs.

For the search results page 220, the query "dog show" meets the image intent threshold. Assume, however, that the query "dog show" is submitted more often for searches of the resource corpus index 112 than for searches of the corpus index 114. Also assume that images that are determined to be responsive for the query "dog show" are determined to be of moderate quality. The insertion system 120 determines that only one row of image search results 228 should be shown in an image display environment 226. Furthermore, the insertion system 120 determines that the image display environment 226 should be positioned at an ordinal position below the ordinal position of several general search results 224, e.g., below general search results 1 and 2.

For the search results page 240, however, the query "dog pictures" has a much higher image intent score in the image intent score for "dog show". Furthermore, there are many more images that are responsive to the query "dog pictures" that are of high quality relative to high-quality images that are responsive to the query "dog show." Accordingly, the number of image search results 248 that are shown with the general search results 244 is more than the number of image search results that are shown for the query "dog show." Furthermore, the image display environment 246 is much larger, and is displayed at the highest ordinal position relative to the general search results, i.e., before general search result 1.

Thus, while the user did not explicitly specify an interest in image that are responsive to the queries "dog show" and "dog pictures," the insertion system 120 infers from the user queries varying levels of informational needs that may be satisfied by images responsive to the respective queries. The number of images, and the position at which the images are presented among the general search results, is proportional to the level of the inferred informational needs for images and the quality of the images available.

§2.0 Image Search Results Insertion System

Figure 3:
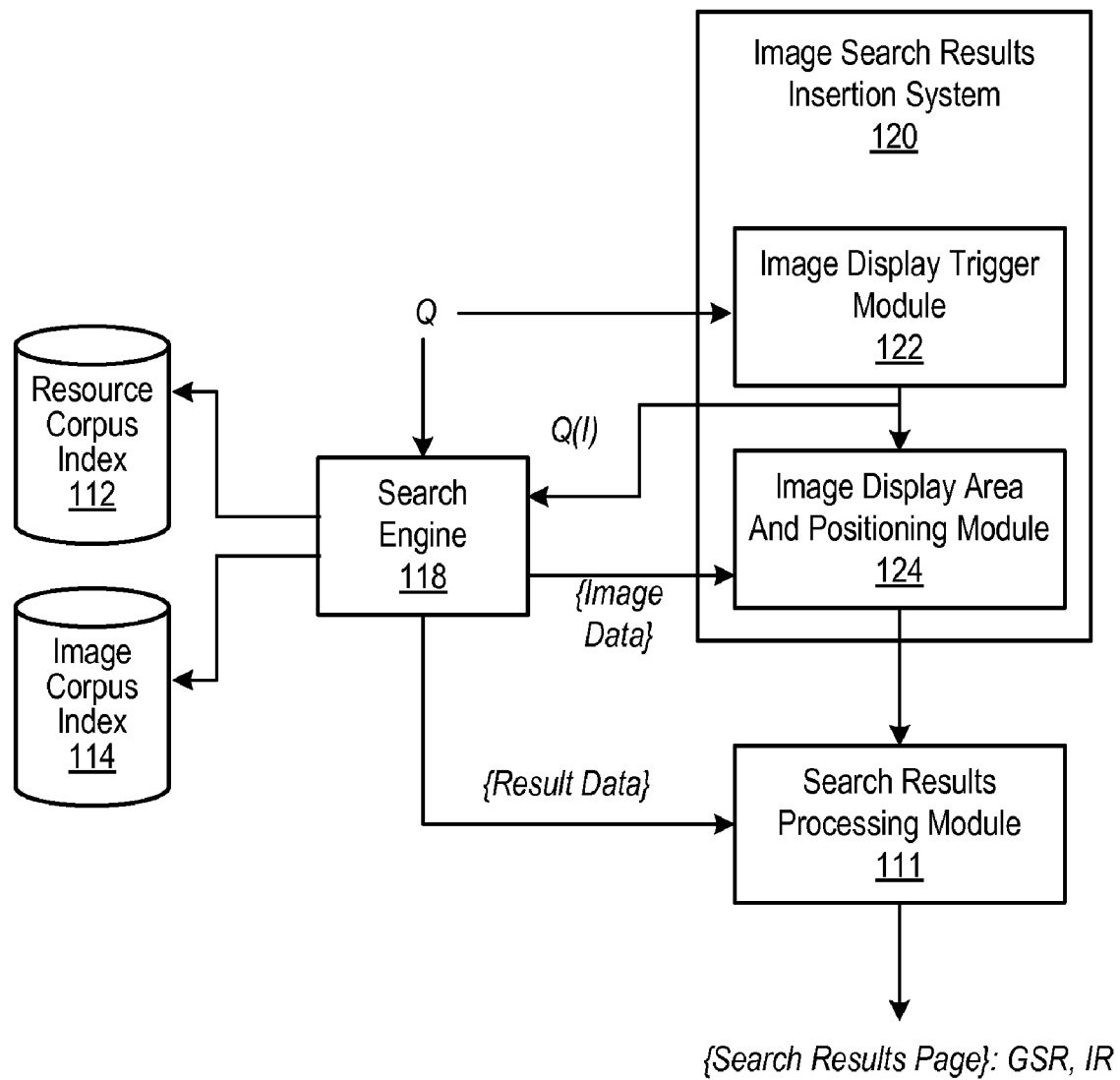
FIG. 3 is a block diagram of an example implementation of an image search results insertion system that inserts image search results into a listing of general search results.

FIG. 3 is a block diagram of an example implementation of the image search results insertion system 120 that inserts image search results into a listing of general search results. The architecture of the insertion system 120 is illustrative only, and other architectures that distribute the described functionalities in a different manner among different processing stages can also be used.

Figure 4:
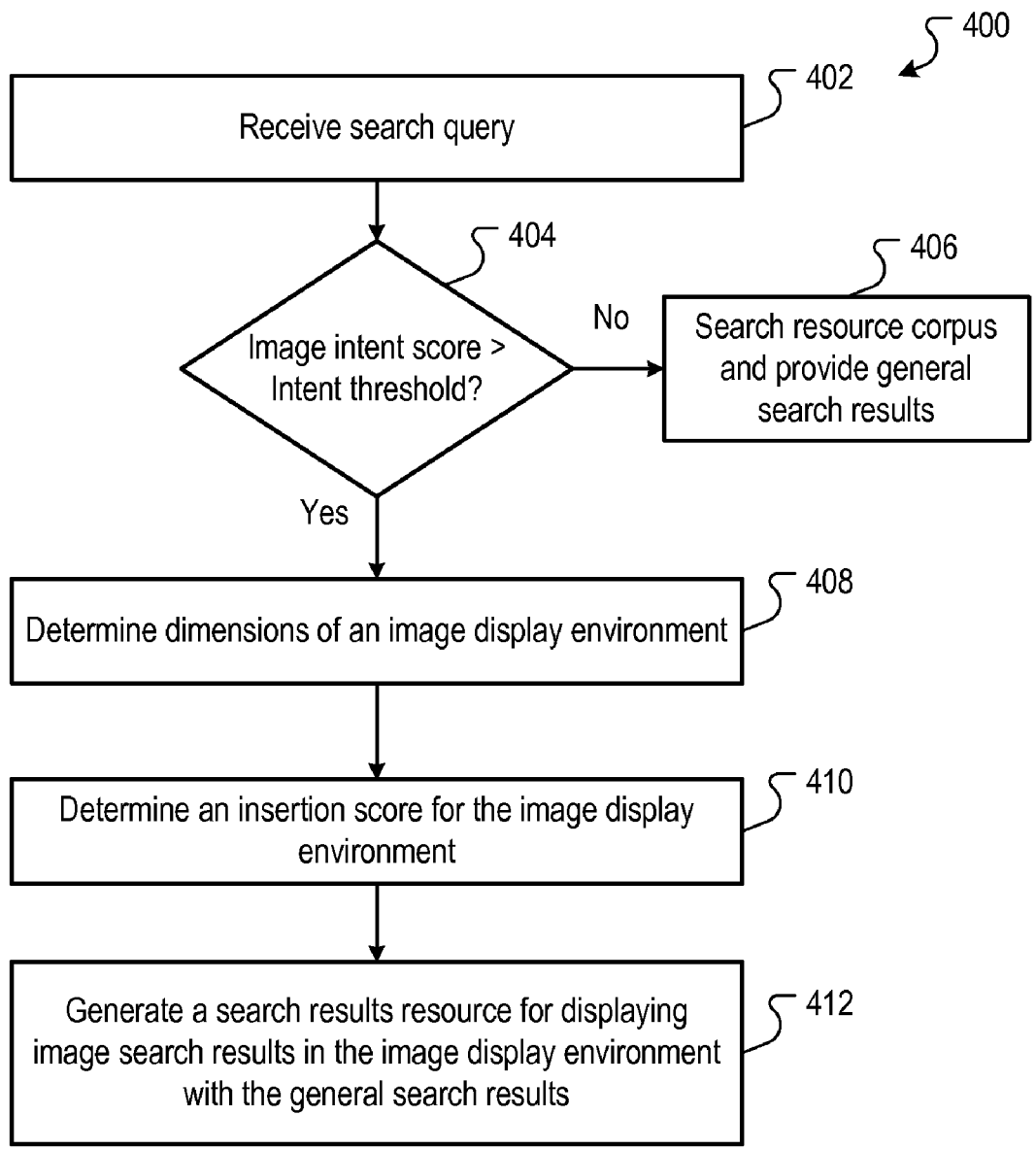
FIG. 4 is a flow diagram of an example process for determining a dynamic image display environment and inserting image search results into a list of general search results.

Operation of the insertion system is described with reference to FIG. 4, which is a flow diagram of an example process 400 for determining a dynamic image display environment and inserting image search results into a list of general search results.

The insertion system 120 receives a search query (402). For example, the user of the user device 106 may submit a search query of one more terms to a search engine 118. The search engine 118, in turn, provides the query to an image displayed trigger module 122. The trigger module 122 is used to determine an image intent score for the query and compare the query to an image intent threshold. One example process of determining an image intent score is described with respect to FIG. 5 below.

The insertion system 120 determines if the image intent score meets the intent threshold (404). If the image intent score of the query does not meet the intent threshold, then the search engine searches the resource corpus and provides general search results (406). For example, for the query "dog food", the image displayed trigger module 122 determines that the query does not meet the image intent threshold. Accordingly, the search engine 118 generates search results 204 for the search results page 200 of FIG. 2A.

Conversely, if the insertion system 120 determines that the image intent score meets the intent threshold, then the trigger module 120 instructs the search engine 118 to search the image corpus index 114 for images that are responsive to the search query. The search engine 118 provides image data to the image display environment and positioning module 124. Example image data includes quality scores of the images that are identified as being responsive to the search query. Example quality scores can be relevance scores that measure the relevance of the image to the query, or a score that is based on a function of a relevance score and a feedback score that measures the selection rate of a search result that references the image for the query, or some other score that a system uses to select images as being responsive to a query.

The image display environment and positioning module 124 uses the image data, and, optionally, the image intent score, to determine dimensions of an image display environment (408). One example process of determining an image display environment is described with respect to FIG. 6 below.

For example, for the query "dog pictures", the trigger module 122 instructs the search engine 118 to search for images that are responsive to the query. The search engine 118, in turn, provides quality scores that measure the quality of images that are responsive to the query to the image display environment and positioning module 124. As there are many high-quality images that are responsive to the query "dog pictures", and, optionally, because the image intent for the query is relatively high, the image display and positioning module 124 determines that a large image display environment will be used to display image search results.

The image display environment and positioning module 124 then determines an insertion score for the image display environment (410). The insertion score is a score based on the quality scores of the images that are determined to be responsive to the search query, and is scaled to the scores that are used to rank the general search results and ascending order. Accordingly, the insertion score defines an ordinal insertion position at which the image display environment is to be inserted into a ranking of the general search results. One example process of determining an insertion score is described with respect to FIG. 7 below.

For example, with respect to the query "dog pictures" of FIG. 2C, there are many images that are responsive to the query and that are determined to be of high quality. Accordingly, the image display environment and positioning module 124 determines a high insertion score that results in the image display environment 246 being displayed at the highest ordinal position relative to the general search results 244.

§2.1 Image Intent of a Query

Figure 5:
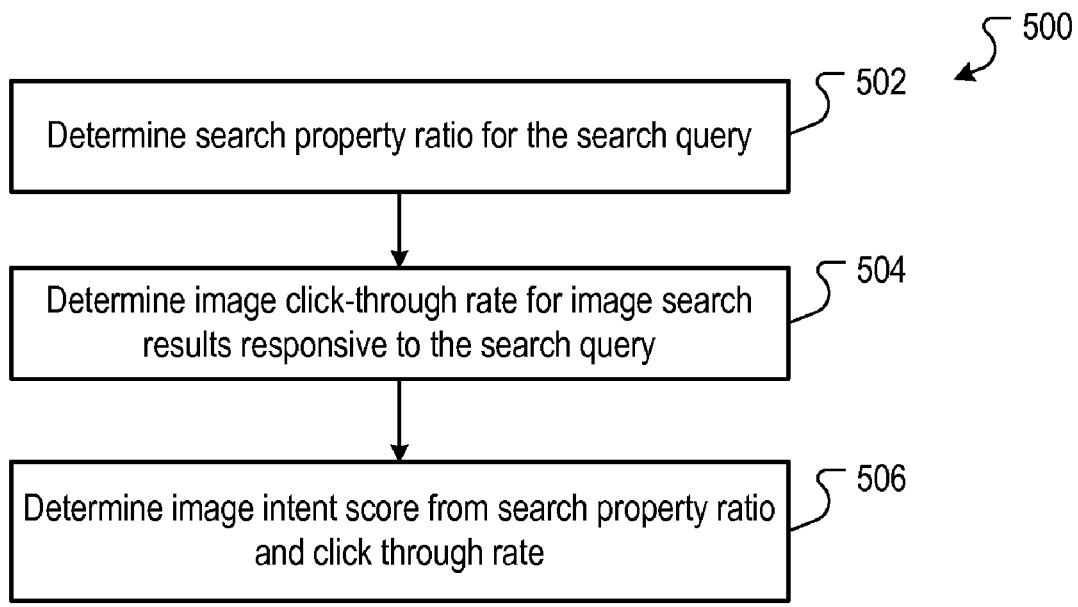
FIG. 5 is a flow diagram of an example process for determining an image intent score.

FIG. 5 is a flow diagram of an example process 500 for determining an image intent score. In some implementations, the image intent score is determined according to equation (1) below:

$$\text{Image\_Intent}(Q) = f(\text{SPR}(Q), \text{CTR}(\{I\}, Q)) \quad (1)$$

where:
Q is a given query;
SPR is a search property ratio;
CTR({I}, Q) is a click-through rate function that outputs a value proportion to the click through rate of the images I that are determined to responsive to the query Q.

Other functions can also be used to determine the image intent score.

In operation, the process 500 determines the search property ratio for the query Q (502). For example, the search property ratio can be proportional to a number of times the search query was submitted by user devices for a search of the image corpus to a number of times that the search query was submitted by user devices for a search of the resource corpus. Thus, a value greater than 1 means the query is used more often to search the image corpus index 114 than it is used to search the resource corpus index 112. Conversely, a value less than 1 means the query is used more often to search the resource corpus index 112 than it is used to search the image corpus index 114.

The process 500 determines an image click through rate for image search results responsive to the search query (504). In some implementations, the image click through rate is the click through rate of image search results when presented with general search results in response to the search query Q.

Other ways of determining an image click through rate can also be used. For example, the image click through rate can be proportional to the click through rate of image search results for the query Q regardless of whether the image search results were presented with general search results or were presented in response to an explicitly specified search of the image corpus index 114.

A variety of functions can be used to determine the image click through rate. For example, the image click through rate can be an central tendency (e.g., average) click through rate of the corresponding click through rates of image search results that are presented, or can just be the click through rate that measures the rate at which any image search result is selected when presented with general search results.

The process 500 determines the image intent score for the search property ratio and the click through rate (506). For example, the search property ratio and the click through rate are input into the image intent function to determine the image intent score. The function can output a product of the two scores, or some other value that is proportional to the two scores.

If the image intent score exceeds an intent threshold, the trigger module 122 generates an image insertion request. The image insertion request, in turn, causes the search engine 118 to search the image corpus index 114 with a search query, and also causes the image display environment and positioning module 124 to determine the dimensions for the image display environment and determine the insertion score.

Other ways of determining an intent score can also be used. For example, an intent score can be determined from only the search property ratio, or from only the click through rate describe above. Alternatively, the intent score can be a binary value that is determined from the search query. The search queries can be categorized as having either a true (1) image intent or a false (0) image intent.

In other implementations, the function can also take into account explicit intent terms in the query Q when determining the intent score. An explicit intent term is a term that is indicative of a presentation type of the information a user desires. For example, terms such as "pictures", "photos" and "diagrams" are explicit intent terms that indicate the user's informational needs will be better satisfied by images rather than information that is primarily textual information. Similarly, terms such "studies", "articles" and "dissertations" are explicit intent terms that indicate the user's informational needs will be better satisfied by information that is primarily textual information rather than images.

In some implementations, the explicit intent terms can be predefined. In other implementations, the explicit intent terms can be determined from processing the historical search data store 116 (i.e., search logs for queries and selection data specifying actions taken in response to search results provided for the queries). For example, for different search queries with a common term "photos" (e.g., "animal photos", "urban photos", etc.), image search results may be selected much more often than for search queries with a different common term "studies" (e.g., "animal studies", "urban studies", etc.).

The explicit intent terms can be scored to indicate a bias towards one type information. For example, the explicit intent scores can be binary scores, or can be real numbers that range from a minimum value to a maximum value. In variations of this implementation, a term may have two explicit intent scores, the first score indicating a bias towards one type information (e.g., general search results), and the second score indicating a bias towards a second type information (e.g., image search results).

§2.2 Image Display Environment

Figure 6:
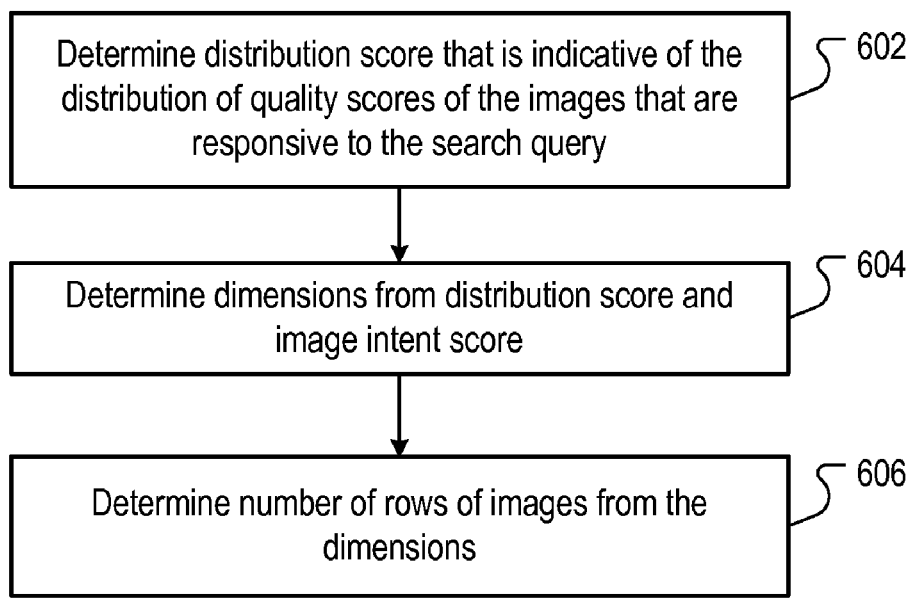
FIG. 6 is a flow diagram of an example process for determining an image display environment.

FIG. 6 is a flow diagram of an example process 600 for determining an image display environment. In some implementations, the image display environment is determined according to equation (2) below:

$$\text{Dimensions(Rows)}=f(\text{Image\_Intent}(Q),\text{Flatness}(\{I\}, Q)) \quad (2)$$

where

Dimensions(Rows) is the size of the image display environment in terms of rows;

Image_Intent(Q) is the image intent score of equation (1); and

Flatness({I}, Q) is a distribution score that is indicative of the distribution of quality scores of the images that are responsive to the search query Q.

In some implementations, flatness score is a geometric mean of the top N relevance scores of images divided by the arithmetic mean of the top N relevance scores. The number N can be selected to include at least the maximum number of images that can be shown in an image display environment. For example, if up to 25 images can be shown in an image display environment, then N can be 25 or greater, e.g., 40, 50, 75, etc. Because this ratio accentuates outliers, a flatness score moves closer to one for queries with high flatness (i.e., queries for which many high-quality images are identified) and moves to a lower value for queries with a smaller number of quality images.

In some implementations, the number of rows may be interpolated between two and eight. In some implementations, the rows are measured in pixels. In other implementations, the rows are measured in terms of general search results space, i.e., the vertical space in a viewport required to display a general search result.

The widths of the image display environment can be depending on the browser agent and viewport size. Such data can be provided from the user device with the query.

In operation, the process 600 determines a distribution score that is indicative of the distribution of quality scores of the images that are responsive to the search query (602). For example, the flatness score described above can be determined. Other functions, however, can also be used to measure a distribution score.

The process 600 determines the dimensions for the image display environment from the distribution score in the image intent score (604). For example, in some implementations the flatness score may be bounded by the underlying quality scores. Accordingly, a value that is proportional to the product of the flatness score and the image intent score is determined, and the values used to interpolate the number of rows (606).

The number of rows that are determined is proportional to the number of rows of image search results that are to be displayed in the image display environment. For example, the number of rows determined may match the number of rows of images that will be displayed. Thus, if the number of rows is six, then six rows of image search results will be displayed in the image display environment. The number of images in each row is dependent on the width of the image display environment.

Other ways of determining dimensions can also be used. For example, the dimensions can be based on the flatness score alone, or can be based on the click through rate of the search results the reference the underlying images.

§2.3 Insertion Score

Figure 7:
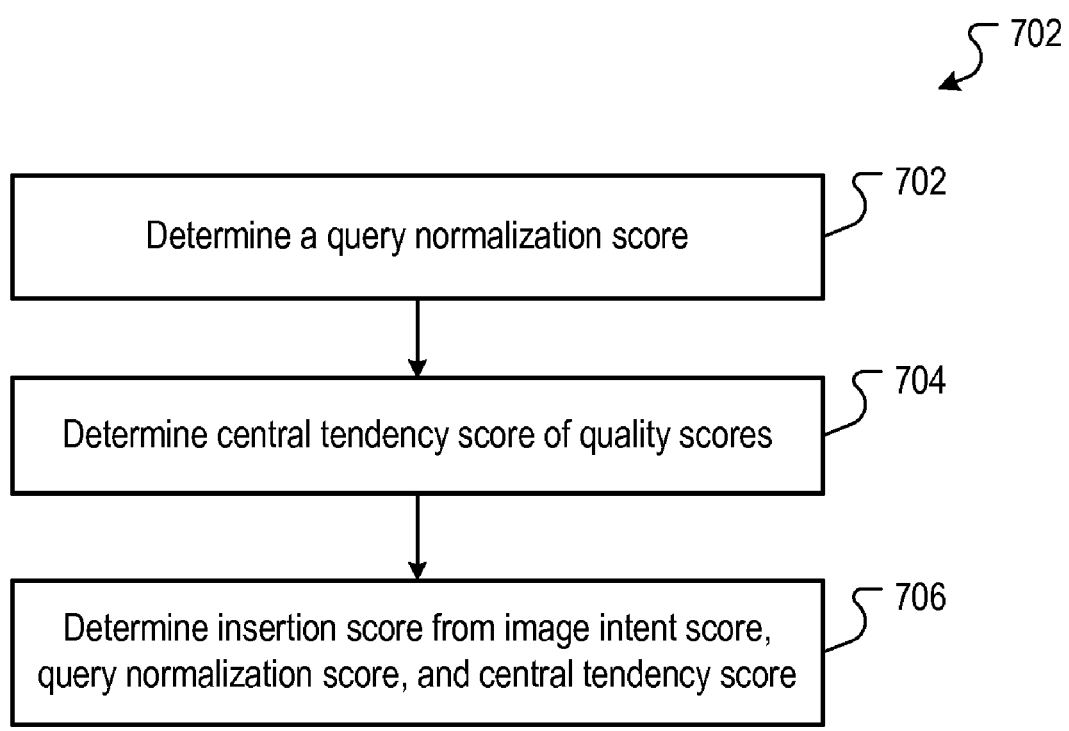
FIG. 7 is a flow diagram of an example process for determining an insertion score.

FIG. 7 is a flow diagram of an example process for determining an insertion score. In some implementations, the insertion score is determined according to equation (3) below:

$$\text{Insertion Score}(Q,\{I\})=f(\text{Image\_Intent}(Q),IR(\{I\}),\text{Normalization}(Q,\{I\})) \quad (3)$$

where

IR({I}) is a score based on the quality scores of the images that are determined to be responsive to the query Q;

Normalization(Q, {I}) is a normalization value derived from the query Q and data and characteristics of the image that are determined to be responsive to the query Q.

The insertion score defines an ordinal insertion position at which the image display environment is to be inserted into the ranked general search results. For example, if the general search results have scores in a range of $1-2^N$, where the score represents a measure of relevance of a resource to the query, and N is an integer value, the insertion score will fall within this range. This ensures that the search results processing module 111 can process the placement of the image display environment in the same manner that it processes the placement of general search results. In other implementations, the insertion score can be the actual ordinal position at which the image display environment is to be displayed. For example, if a search results page usually displays 10 search results, the insertion score may range from 1-10.

In operation, the process 700 determines the query normalization score (702). In some implementations, normalization score is determined according to formula (4) below:

$$\text{Normalization}(Q, \{I\}) = f(\text{CC}(\{I\}), \text{Flatness}(\{I\}, Q), \text{Length}(Q)) \quad (4)$$

where
- CC({I}) is a clustering characteristic of images that are responsive to the query Q;
- Flatness({I}, Q) is the distribution score that is indicative of the distribution of quality scores of the images that are responsive to the search query Q; and
- Length(Q) is a score length that is proportional to the number of terms in the query Q.

The clustering characteristic describes the classification of the images responsive to the query Q, or a subset of the images, into a single cluster. In some implementations, the clustering characteristic CC is derived from co-click data. Co-click data is click-related data describing the selection of image search results of the images for the query Q. In some implementations, the co-click data is derived from pair-wise cosine similarity measurements of image vectors for respective images that are identified as being responsive to the query Q. The image vectors are a representation of clicks on images for queries. A substantially uniform distribution of relatively strong similarity measurements from co-click data across the identified images is interpreted as a signal that the images are high-quality images. This is because many high-quality images will be selected at relatively equal frequencies for particular queries. However, a non-uniform distribution of co-click data across images is interpreted as a signal that the images are substantially random images with respect to each other, or that there is not enough co-click data from which an accurate clustering characteristic can be derived.

The query length score is a score that is proportional to the length of the query. In some implementations, the query length score may be capped to a maximum value.

The process 700 determines a central tendency score of the relevance scores (704). In some implementations, the central tendency score is proportional to a mean of the relevance scores of the images that are to be shown in the image display environment. In other implementations, the central tendency score can be proportional to the mean of the relevance scores of the images that are to be shown in image display environment, and additional images that are determined to be responsive to the query Q.

The process 700 determines an insertion score from the image intent score, the query normalization score, and the central tendency score (706). In some implementations, the insertion score is a product of the query normalization score, the insertion score, and the central tendency score. Other functions can also be used.

The scores that are used to generate the insertion score are illustrative only, and additional scores or fewer scores can be used. For example, the insertion score can be based only on the image intent and quality scores described above.

Once the insertion score is generated, the search results processing module 111 compares the insertion score to the relevance scores of the general search results. Based on this comparison, search results processing module 111 inserts the image display environment so that it is displayed above the general search result with a corresponding score that is lower than the insertion score.

§3.0 Additional Implementation Details

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:
1. A system comprising:
a data processing apparatus; and
a computer storage medium encoded with a computer program, the program comprising data processing apparatus instructions executable by the data processing apparatus and that upon such execution cause the data processing apparatus to perform operations comprising:
in response to an image insertion request specifying a request to insert image search results that are responsive to a search query into a list of general search results:
determining dimensions of an image display environment in which image search results are to be displayed, the dimensions determined, in part, from a distribution of quality scores of images that are responsive to the search query and the dimensions defining number of rows of image search results that are to be displayed;
determining an insertion score that defines an ordinal insertion position at which the image display environment is to be inserted into a ranking of the general search results that defines ordinal positions for each of the general search results, the insertion score determined, in part, from the quality scores of the images;
generating a search results resource for displaying the general search results according to their respective ordinal positions and the image display environment at the ordinal insertion position on a client device; and
providing the search results resource in response to the search query;
wherein each of the image search results is a generated from a search of an image corpus and includes a thumbnail version of an image identified from the search of the image corpus and an address to retrieve the image, and each general search result is generated from a search of a resource corpus that is different from the image corpus and includes a snippet of text of a resource identified from the search and an address to retrieve the resource.

2. The system of claim 1, wherein the data processing apparatus instructions cause the data processing apparatus to perform operations comprising:
determining an image intent score for the search query; and
generating an image insertion request when the image intent score exceeds an intent threshold.

3. The system of claim 2, wherein determining the image intent score for the search query comprises:
determining a search property ratio of the search query that is proportional to a number of times the search query was submitted by client devices a search of the image corpus to a number of times that the search query was submitted by client devices for a search of the resource corpus;
determining an image click-through rate of image search results presented with general search results in response to the search query; and
determining the image intent score from the search property ratio and the image click-through rate.

4. The system of claim 2, wherein determining the image intent score for the search query comprises:
determining a search property ratio of the search query that is proportional to a number of times the search query was submitted by client devices a search of the image corpus to a number of times that the search query was submitted by client devices for a search of the resource corpus;
identifying an explicit intent term in the search query;
determining an explicit intent score associated with the explicit intent term; and
determining the image intent score from the search property ratio and the explicit intent score.

5. The system of claim 2, wherein determining dimensions of the image display environment comprises:
determining a distribution score that is indicative of the distribution of quality scores of the images that are responsive to the search query;
determining a product of the distribution score and the image intent score; and
determining a number of rows of images to display in the image display environment from the product of the distribution score and the image intent score.

6. The system of claim 1, wherein:
determining dimensions of the image display environment comprises determining a distribution score that is indicative of the distribution of quality scores of the images that are responsive to the search query; and
determining a number of rows of images to display in the image display environment from the distribution score.

7. The system of claim 1, wherein determining an insertion score comprises:
determining central tendency score from relevance scores of images that are to be displayed in the image display environment, each relevance score being a measure of relevance of a corresponding image to the search query.

8. The system of claim 7, wherein determining an insertion score further comprises:
determining an image intent score for the search query; and
determining the insertion score from the image intent score and the central tendency score.

9. The system of claim 8, wherein determining the image intent score for the search query comprises:
determining a search property ratio of the search query that is proportional to a number of times the search query was submitted by client devices a search of the image corpus to a number of times that the search query was submitted by client devices for a search of the resource corpus;
determining an image click-through rate of image search results presented with general search results in response to the search query; and
determining the image intent score from the search property ratio and the image click-through rate.

10. The system of claim 1, wherein determining an insertion score further comprises:
determining a clustering score that measures a clustering characteristic of images that are responsive to the search query;
determining an image intent score for the search query; and
determining the insertion score from the image intent score, and the clustering score.

11. The system of claim 1, wherein determining an insertion score further comprises:
determining a clustering score that measures a clustering characteristic of images that are responsive to the search query;
determining an image intent score for the search query;
determining a query length score that is proportional to a number of query terms in the search query; and
determining the insertion score from the image intent score, the clustering score, and the query length score.

12. A system, comprising:
a data processing apparatus; and
a computer storage medium encoded with a computer program, the program comprising data processing apparatus instructions executable by the data processing apparatus and that define an image display trigger module, an image display environment and positioning module, and a search results processing module, each of the modules executable by the data processing apparatus, wherein:
the image display trigger module causes the data processing apparatus to perform operations comprising:
determining an image intent score for the search query; and
generating an image insertion request specifying a request to insert image search results that are responsive to a search query into a list of general search results when the image intent score exceeds an intent threshold;
the image display environment and positioning module, in response to the image insertion request, causes the data processing apparatus to perform operations comprising:
determining dimensions of an image display environment in which image search results are to be displayed, the display area dimensions determined, in part, from quality scores of images that are responsive to the search query;
determining an insertion score that defines an ordinal insertion position at which the image display environment is to be inserted into a ranking of the general search results that defines ordinal positions for each of the general search results, the insertion score determined, in part, from the quality scores of the images;

the search results processing module causes the data processing apparatus to perform operations comprising:
generating a search results resource for displaying the general search results according to their respective ordinal positions and the image display environment at the ordinal insertion position on a client device; and
providing the search results resource in response to the search query;
wherein each of the image search results is a generated from a search of an image corpus and includes a thumbnail version of an image identified from the search of the image corpus and an address to retrieve the image, and each general search result is generated from a search of a resource corpus that is different from the image corpus and includes a snippet of text of a resource identified from the search and an address to retrieve the resource.

13. A method implemented in a data processing apparatus, comprising:
generating, at a data processing apparatus, an image insertion request specifying a request to insert image search results that are responsive to a search query into a list of general search results, and in response:
determining, by a data processing apparatus, dimensions of an image display environment in which image search results are to be displayed, the dimensions determined, in part, from a distribution of quality scores of images that are responsive to the search query and the dimensions defining number of rows of image search results that are to be displayed;
determining an insertion score that defines an ordinal insertion position at which the image display environment is to be inserted into a ranking of the general search results that defines ordinal positions for each of the general search results, the insertion score determined, in part, from the quality scores of the images;
generating a search results resource for displaying the general search results according to their respective ordinal positions and the image display environment at the ordinal insertion position on a client device; and
providing the search results resource in response to the search query;
wherein each of the image search results is a generated from a search of an image corpus and includes a thumbnail version of an image identified from the search of the image corpus and an address to retrieve the image, and each general search result is generated from a search of a resource corpus that is different from the image corpus and includes a snippet of text of a resource identified from the search and an address to retrieve the resource.

14. The method of claim 13, further comprising:
determining an image intent score for the search query; and
generating the image insertion request when the image intent score exceeds an intent threshold.

15. The method of claim 14, wherein determining the image intent score for the search query comprises:
determining a search property ratio of the search query that is proportional to a number of times the search query was submitted by client devices a search of the image corpus to a number of times that the search query was submitted by client devices for a search of the resource corpus;
determining an image click-through rate of image search results presented with general search results in response to the search query; and
determining the image intent score from the search property ratio and the image click-through rate.

16. The method of claim 14, wherein determining dimensions of the image display environment comprises:
determining a distribution score that is indicative of the distribution of quality scores of the images that are responsive to the search query;
determining a product of the distribution score and the image intent score; and
determining a number of rows of images to display in the image display environment from the product of the distribution score and the image intent score.

17. The method of claim 13, wherein:
determining dimensions of the image display environment comprises determining a distribution score that is indicative of the distribution of quality scores of the images that are responsive to the search query; and
determining a number of rows of images to display in the image display environment from the distribution score.

18. The method of claim 13, wherein determining an insertion score comprises:
determining central tendency score from relevance scores of images that are to be displayed in the image display environment, each relevance score being a measure of relevance of a corresponding image to the search query.

19. The method of claim 18, wherein determining an insertion score further comprises:
determining an image intent score for the search query; and
determining the insertion score from the image intent score and the central tendency score.

20. The method of claim 19, wherein determining the image intent score for the search query comprises:
determining a search property ratio of the search query that is proportional to a number of times the search query was submitted by client devices a search of the image corpus to a number of times that the search query was submitted by client devices for a search of the resource corpus;
determining an image click-through rate of image search results presented with general search results in response to the search query; and
determining the image intent score from the search property ratio and the image click-through rate.

21. The method of claim 13, wherein determining an insertion score further comprises:
determining a clustering score that measures a clustering characteristic of images that are responsive to the search query;
determining an image intent score for the search query; and
determining the insertion score from the image intent score, and the clustering score.

22. The method of claim 13, wherein determining an insertion score further comprises:
determining a clustering score that measures a clustering characteristic of images that are responsive to the search query;
determining an image intent score for the search query;
determining a query length score that is proportional to a number of query terms in the search query; and
determining the insertion score from the image intent score, the clustering score, and the query length score.

* * * * *